United States Patent
Ruiz et al.

(10) Patent No.: US 9,378,440 B1
(45) Date of Patent: Jun. 28, 2016

(54) SYSTEM AND METHOD FOR REDUCING TONER CONTAMINATION ON ROLL PAIR OF AN IMAGE FORMING APPARATUS

(71) Applicant: XEROX CORPORATION, Norwalk, CT (US)

(72) Inventors: Erwin Ruiz, Rochester, NY (US); Steven M. Russel, Bloomfield, NY (US); Paul M. Fromm, Rochester, NY (US); Robert W. Phelps, Victor, NY (US); John T. Newell, III, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/672,643

(22) Filed: Mar. 30, 2015

(51) Int. Cl.
 H04N 1/60 (2006.01)
 G06K 15/00 (2006.01)
 H04N 1/46 (2006.01)
 G06K 15/02 (2006.01)

(52) U.S. Cl.
 CPC .................................. *G06K 15/1881* (2013.01)

(58) Field of Classification Search
 None
 See application file for complete search history.

(56) References Cited

U.S. PATENT DOCUMENTS

| | | | | | |
|---|---|---|---|---|---|
| 4,953,013 | A | * | 8/1990 | Tsuji | H04N 1/46 358/447 |
| 5,351,138 | A | * | 9/1994 | Sasaki | H04N 1/40075 358/448 |
| 5,561,455 | A | * | 10/1996 | Teshigawara | H04N 1/52 347/131 |
| 5,953,459 | A | * | 9/1999 | Ueda | H04N 1/4051 358/3.13 |
| 6,014,501 | A | * | 1/2000 | Fukuda | H04N 1/40068 235/494 |
| 6,320,676 | B1 | * | 11/2001 | Yoshidome | G06T 5/20 358/1.9 |

(Continued)

*Primary Examiner* — Madelein Nguyen
(74) *Attorney, Agent, or Firm* — Ronald E. Prass, Jr.; Prass LLP

(57) ABSTRACT

A method of printing a half tone image on an image forming apparatus using toner that is fused to a substrate is provided. The method includes generating a dot design that represents the half tone image, the dot design being made up of a plurality of dots; analyzing the dot design using an algorithm; matching the dot design to an equivalent alternate design that represents the half tone image, the matching being based on results of the analyzing, the equivalent alternate design being made up substantially entirely of a plurality of non-dot shapes; forming the half tone image on the substrate using the equivalent alternate design; and fusing the half tone image on the substrate with a fuser device.

20 Claims, 5 Drawing Sheets

(56) References Cited

U.S. PATENT DOCUMENTS

| | | | | |
|---|---|---|---|---|
| 6,600,579 B1* | 7/2003 | Kumagai | ............ | H04N 1/00002 358/461 |
| 6,750,990 B1* | 6/2004 | Ohashi | ............... | H04N 1/00002 358/471 |
| 7,580,153 B2* | 8/2009 | Eschbach | ........... | G06K 15/1831 358/1.11 |
| 8,482,802 B2* | 7/2013 | Tai | ....................... | H04N 1/4015 358/1.1 |
| 9,147,232 B1* | 9/2015 | Kuo | ........................... | G06T 5/30 |
| 2002/0031276 A1* | 3/2002 | Yagishita | ................ | G06T 9/004 382/252 |
| 2002/0089708 A1* | 7/2002 | Cheng | ..................... | H04N 1/52 358/534 |
| 2002/0158926 A1* | 10/2002 | Fukano | ................ | B41J 2/04541 347/11 |
| 2002/0163528 A1* | 11/2002 | Cooper | ................ | H04N 1/4055 345/596 |
| 2003/0035673 A1* | 2/2003 | Yamakawa | ......... | H04N 1/40062 400/76 |
| 2003/0072035 A1* | 4/2003 | Hagai | .................. | H04N 1/4052 358/3.03 |
| 2003/0095272 A1* | 5/2003 | Nomizu | ............. | H04N 1/32561 358/1.9 |
| 2003/0184808 A1* | 10/2003 | Fukuda | ................ | H04N 1/4092 358/2.1 |
| 2005/0031203 A1* | 2/2005 | Fukuda | ............... | H04N 1/84092 382/176 |
| 2005/0073543 A1* | 4/2005 | Nishikori | ............... | B41J 2/2054 347/15 |
| 2006/0251437 A1* | 11/2006 | Donaldson | ......... | G03G 15/5041 399/49 |
| 2007/0139680 A1* | 6/2007 | Eschbach | ............. | G03G 21/043 358/1.11 |
| 2007/0146818 A1* | 6/2007 | Horiguchi | ........ | H04N 1/00681 358/474 |
| 2007/0273917 A1* | 11/2007 | Encrenaz | ............... | G06K 15/02 358/1.15 |
| 2008/0013831 A1* | 1/2008 | Aoki | .................. | G06K 9/00463 382/176 |
| 2008/0080026 A1* | 4/2008 | Mestha | ..................... | G01J 3/02 358/504 |
| 2009/0009766 A1* | 1/2009 | Bonino | ..................... | G01J 3/02 356/402 |
| 2009/0033970 A1* | 2/2009 | Bray | ....................... | H04N 1/60 358/1.13 |
| 2009/0296091 A1* | 12/2009 | Skinner | ..................... | G01J 3/52 356/402 |
| 2010/0003045 A1* | 1/2010 | Kella | ................ | H04N 1/40025 399/74 |
| 2010/0053682 A1* | 3/2010 | Gotoh | ................ | H04N 1/00411 358/1.15 |
| 2010/0201995 A1* | 8/2010 | Yoshida | ............. | H04N 1/00355 358/1.2 |
| 2010/0220363 A1* | 9/2010 | Paul | ....................... | H04N 1/506 358/3.26 |
| 2010/0309526 A1* | 12/2010 | Kulkarni | ............... | H04N 1/506 358/3.26 |
| 2011/0200346 A1* | 8/2011 | Hosier | ................ | H04N 1/4058 399/49 |
| 2012/0026517 A1* | 2/2012 | Gross | .................. | H04N 1/6036 358/1.9 |
| 2012/0243009 A1* | 9/2012 | Chapman | ................ | H04N 1/54 358/1.9 |
| 2013/0128317 A1* | 5/2013 | Chapman | ................ | H04N 1/54 358/2.1 |
| 2014/0037306 A1* | 2/2014 | Kuo | ........................ | H04N 1/52 399/39 |
| 2014/0126018 A1* | 5/2014 | Sugimoto | ............... | G06F 3/013 358/1.15 |
| 2014/0204433 A1* | 7/2014 | Koyama | ............ | H04N 1/00909 358/496 |
| 2014/0300938 A1* | 10/2014 | Oosaki | ............... | H04N 1/00655 358/498 |
| 2014/0368895 A1* | 12/2014 | Teramoto | ........... | H04N 1/00689 358/498 |
| 2015/0022828 A1* | 1/2015 | Miyamoto | ......... | G03G 15/5058 358/1.1 |
| 2015/0145943 A1* | 5/2015 | Herloski | .................. | B41J 2/473 347/252 |

\* cited by examiner

SYSTEM AND METHOD FOR REDUCING TONER CONTAMINATION ON ROLL PAIR OF AN IMAGE FORMING APPARATUS

BACKGROUND

Disclosed herein are systems and methods for reducing the toner dirt contamination on a roll pair of an image forming apparatus.

Embodiments of the disclosure are well suited for image forming devices using a toner that is fused to a substrate.

SUMMARY

Some image forming devices use a nip, for example between two rolls, to apply pressure to an image formed on a sheet of media. The two rolls can be a fuser roll and a pressure roll. As the speed of media going through the nip increases, so does the amount of toner contamination on the roll pair. This toner contamination can also increase as a result of using rough media and in the case of half tone images. Especially in the case where all three of these contributing factors are present, the toner contamination can rise to unacceptable levels.

Embodiments of the disclosure provide systems and methods that reduce the toner contamination by using an algorithm to remap the half tone area from a dot design to a non-dot design.

An embodiment of the disclosure may include a method of printing a half tone image on an image forming apparatus using toner that is fused to a substrate. The method includes generating a dot design that represents the half tone image, the dot design being made up of a plurality of dots; analyzing the dot design using an algorithm; matching the dot design to an equivalent alternate design that represents the half tone image, the matching being based on results of the analyzing, the equivalent alternate design being made up substantially entirely of a plurality of non-dot shapes; forming the half tone image on the substrate using the equivalent alternate design; and fusing the half tone image on the substrate with a fuser device.

Another embodiment of the disclosure may include an image forming apparatus for printing a half tone image using toner that is fused to a substrate. The apparatus includes means for generating a dot design that represents the half tone image, the dot design being made up of a plurality of dots; means for analyzing the dot design using an algorithm; means for matching the dot design to an equivalent alternate design that represents the half tone image, the matching being based on results of the analyzing, the equivalent alternate design being made up substantially entirely of a plurality of non-dot shapes; means for forming the half tone image on the substrate using the equivalent alternate design; and means for fusing the half tone image on the substrate with a fuser device.

Another embodiment of the disclosure may include an image forming apparatus for printing a half tone image using toner that is fused to a substrate. The apparatus includes a processor that uses an algorithm to analyze a dot design that represents the half tone image, the dot design being made up of a plurality of dots, the processor matching the dot design to an equivalent alternate design that represents the half tone image, the matching being based on results of the analysis, the equivalent alternate design being made up substantially entirely of a plurality of non-dot shapes; and a fuser device that fuses the half tone image on the substrate, the half tone image being formed on the substrate prior to the fusing, the half tone image being formed using the equivalent alternate design.

DETAILED DESCRIPTION

Figure 1:
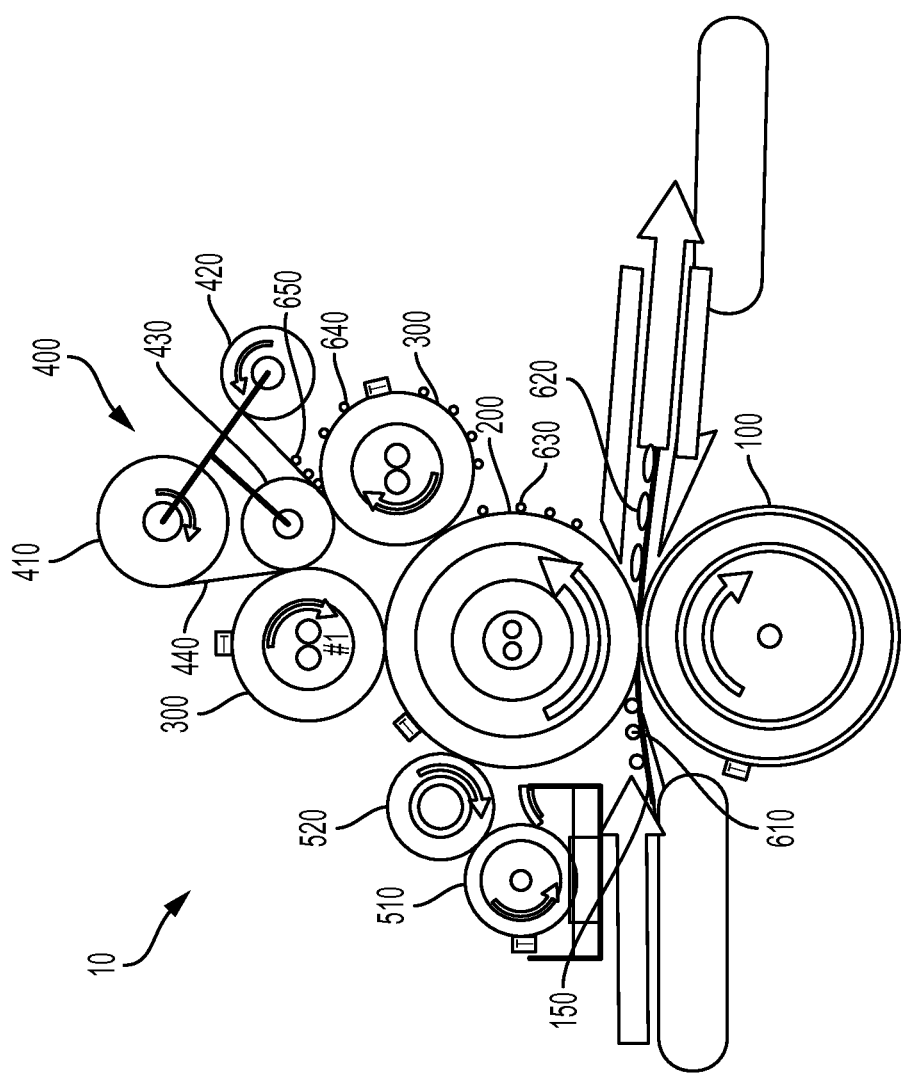
FIG. 1 is a schematic view of an image forming apparatus in accordance with embodiments of the disclosure.

The disclosed embodiments may include a method of printing a half tone image on an image forming apparatus using toner that is fused to a substrate. The method includes generating a dot design that represents the half tone image, the dot design being made up of a plurality of dots; analyzing the dot design using an algorithm; matching the dot design to an equivalent alternate design that represents the half tone image, the matching being based on results of the analyzing, the equivalent alternate design being made up substantially entirely of a plurality of non-dot shapes; forming the half tone image on the substrate using the equivalent alternate design; and fusing the half tone image on the substrate with a fuser device.

Some embodiments also provide a ratio of the total image area of the alternate design to the total image perimeter of the alternate design being greater than a ratio of the total image area of the dot design to the total image perimeter of the dot design, where the total image area of the dot design is the sum of an image area of every one of the dots in the dot design, the total image perimeter of the dot design is the sum of an image perimeter of every one of the dots in the dot design, the total image area of the alternate design is the sum of an image area of every one of the non-dot shapes in the alternate design, and the total image perimeter of the alternate design is the sum of an image perimeter of every one of the non-dot shapes in the alternate design.

In some image forming devices that include a fuser roll, a carbon nanotube (CNT) fuser roll can be used to increase the speed, and thus the productivity, of the image forming device. The CNT fuser roll has thermal properties advantages over some conventional fuser rolls. This advantage enables fusing at higher speeds, a feature that enables some image forming devices to increase productivity from 120 to 135 pages per minute. A side effect associated with the CNT fuser roll and the conductive pressure roll pair is a potential increase in the toner dirt contamination rate. The increase of the contamination rate is the result of the interaction between the CNT fuser roll and the conductive pressure roll and the use of rough (uncoated) media and image type (half tone image). In some cases, the rougher the media, the more contamination that is generated.

The excess contamination is created by un-fused toner particles in half tone type images on uncoated/rough media. During fusing, the fuser roll has to conform in order to apply the right pressure to fuse all the toner particles. The interaction between toner pile height, fuser roll modulus and media surface fibers (media roughness) will limit the ability to fuse all of the toner particles. These un-fused toner particles will travel over the fuser roll, pressure roll, external heat rolls and web cleaner. The excess contamination will over saturate the web cleaning material, affecting the web cleaning capability to pick up the loose toner particles. Once the system gets over saturated with toner, the toner particles will start to deposit on the external heat rolls, fuser roll and pressure roll. The excess contamination will eventually create images defects, resulting in premature fuser roll failure. Other effects includes shortening the external heat roll cleaning intervals and toner chunks due to web material oversaturation. These toner chunks will fall on the media and creates image defects.

Some image forming devices counteract the increased contamination by increasing the web cleaner speed in order to maintain an effective cleaning rate. Increasing the web cleaner speed can significantly impact the running cost due to having to change the cleaner web more frequently.

FIG. 1 shows an example of an image forming apparatus 10 in accordance with embodiments of the disclosure. Image forming apparatus 10 includes a pressure roll 100 and a fuser roll 200 that form a nip through which a sheet of media 150 passes. Toner 610 forming an image on media 150 is fused to media 150 in the nip, resulting in the fused image 620. External heat rolls 300 (in this example, two) provide heat to fuser roll 200 such that fuser roll 200 maintains the proper temperature for fusing. A web cleaning system 400 cleans external heat rolls 300. Web cleaning system 400 includes a web take-up roll 410, a web supply roll 420 and a pressure roll 430 that move a cleaning web 440 across external heat rolls 300 to clean toner contamination off of external heat rolls 300. Also shown in FIG. 1 are a meter roll 510 and a donor roll 520 that provide dampening fluid to fuser roll 200.

FIG. 1 shows the path of toner contamination that can exist in image forming devices. Excess toner 630 that is not fused to media 150 sticks to fuser roll 200 and is transferred to external heat rolls 300 (indicated as 640). Cleaning web 440 then removes contamination 640 from external heat rolls 300 (indicated as 650). Cleaning web 440 must be replaced after (preferably before) it reaches a saturation point. Once cleaning web 440 reaches a saturation point, it can no longer remove toner contamination from external heat rolls 300. At this point fuser roll 200 becomes contaminated and image quality deteriorates.

Figure 2:
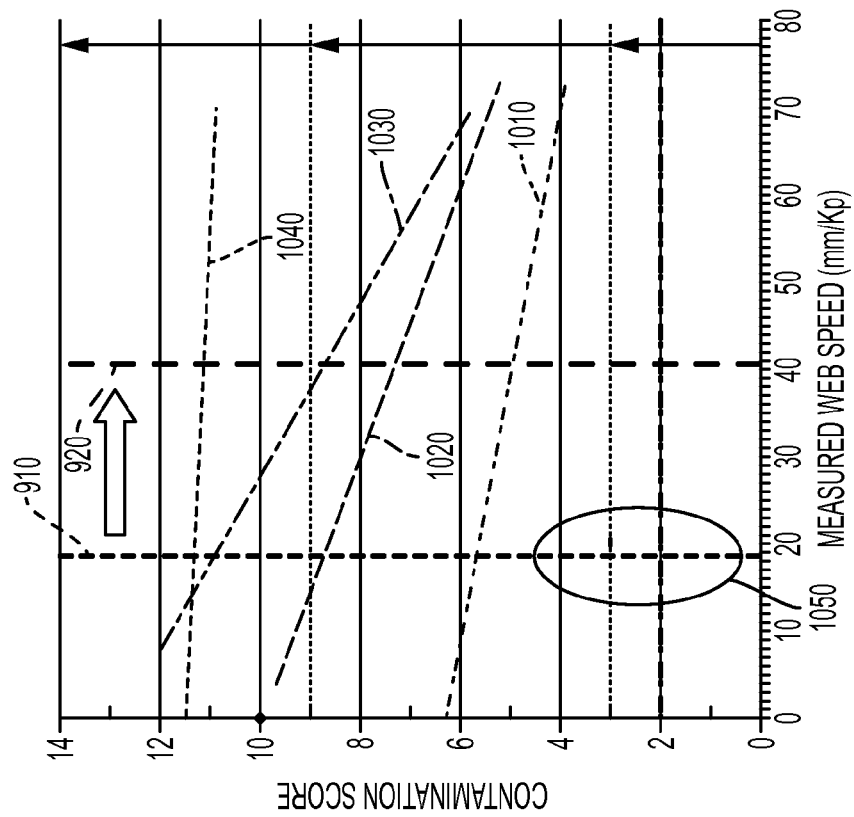
FIG. 2 is a graph showing contamination as a function of cleaning web speed.

As explained above, increasing the speed of the fuser roll can result in increased toner contamination, which results in cleaning web 440 reaching its saturation point sooner. FIG. 2 shows examples of how contamination (indicated here by a contamination score on the vertical axis) decreases as cleaning web speed is increased. Line 910 indicates a base line web speed and line 920 indicates an increased web speed. Data lines 1010, 1020, 1030 and 1040 represent different combinations of CNT fuser roll construction, toner, and media roughness at elevated fuser roll speeds. For all of the combinations represented, FIG. 2 shows that increasing cleaner web speed reduces fuser roll contamination. FIG. 2 also shows data for conventional VC50 fuser roll speeds (inside oval 1050). For all reasonable cleaning web speeds, FIG. 2 shows that the contamination scores of increased fuser roll speeds are above the contamination scores of conventional fuser roll speeds regardless of cleaning web speed.

Figure 3:
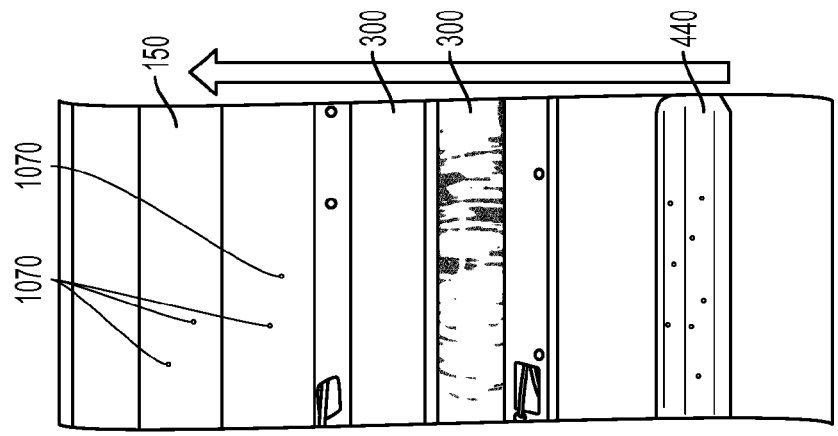
FIG. 3 shows examples of contamination failure mode of some of the fuser assembly components

FIG. 3 shows some of the results of an over saturated cleaning web 440. Toner chunks 1070 can be deposited on media 150, and external heat rolls 300 can be become contaminated to the point of needing shorter cleaning intervals.

Figure 4:
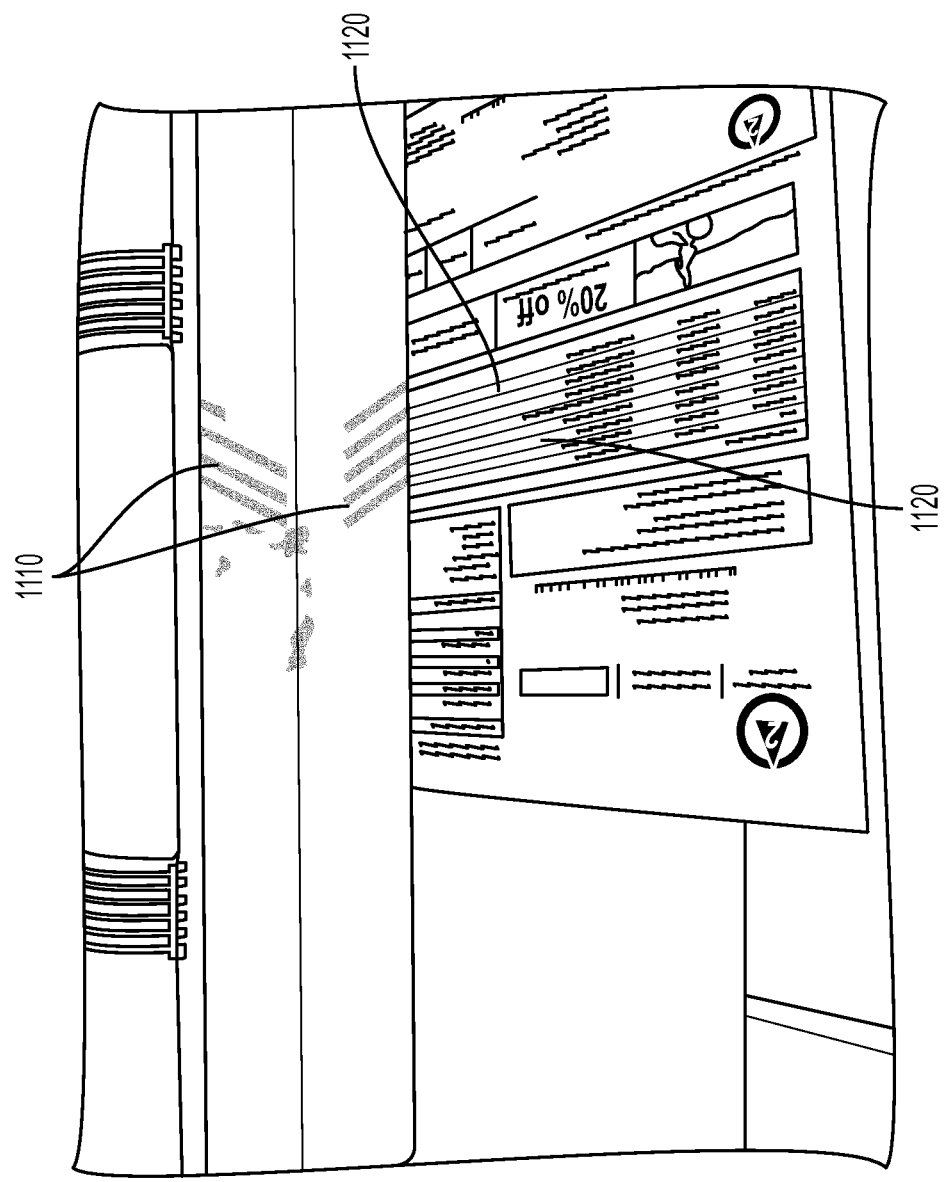
FIG. 4 shows an example of contamination on the web cleaner fabric

Some print jobs run the same image for several thousands of prints. These print jobs often include half tone images. When these jobs are run with regular media, the images will generate more toner contamination in the half tone area than in the rest of the document. This can create toner dirt contamination bands on the system. FIG. 4 shows an document that has half tone areas 1120 that are shading on every other line of the table portion of the document. These half tone areas 1120 result in toner contamination bands 1100 on the web cleaning fabric material.

Embodiments of the disclosure recognize that the conventional dot pattern designs used to generate half tone image areas can result in high toner contamination, especially on rough media at high speeds, due to the toner pile height relative to the area covered by the individual dot.

In general, the greater the area/perimeter ratio, the less the contamination. This goes for all levels of the halftone. If a line screen is used instead of a dot screen, there is significantly less contamination. Lower frequency halftone patterns using larger dots generally will have less contamination than higher frequency halftone dot patterns which use smaller dots. The trouble is that the larger the dot, the more visible the dot pattern so there is a tradeoff between visibility of the dot and the contamination. Embodiments of the disclosure would be very useful when running large volumes of documents where the image quality is not as critical such as transactional statements.

Embodiments of the disclosure replace the conventional dot pattern design with a non-dot pattern design such as, for example, a line like pattern design (or line screen), to simulate an equivalent half tone images from the conventional toner dot pattern. Half tone images created by line like design generate less contamination than the conventional dot design.

In exemplary embodiments, for any give output density the actual area coverage would be the same whether a dot pattern or a non-dot pattern is used. If the lines were the same width as the diameter of a typical dot, the frequency of the line screen would be significantly lower in order to get the same amount of white space and, therefore, area coverage. It is typical for a line screen to have a lower frequency than a dot screen.

Exemplary embodiments can provide less stray toner in the white spaces of the image because a thin line can be more xerographically stable than a wider dot. Single toner particles often don't feel enough pressure to stick to the media and can nestle down between paper fibers and then get hot where they lightly touch the fuser roll. As a result, they can stick to the fuser roll and not the media.

Figure 6:
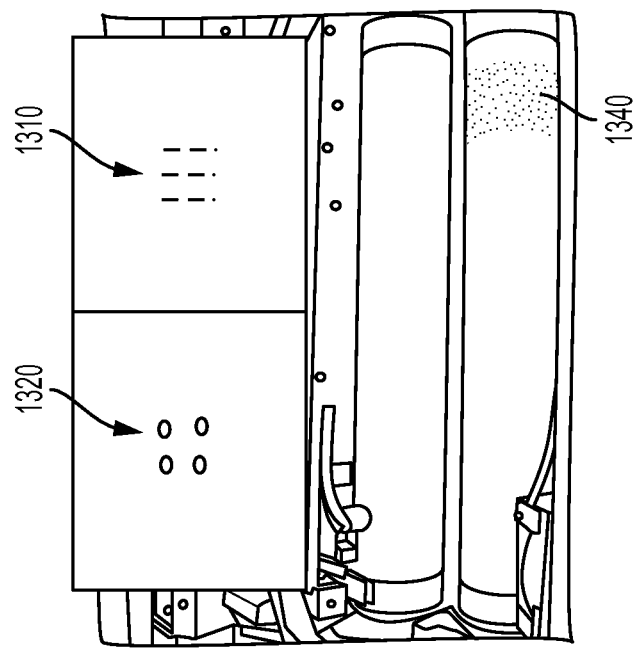
FIG. 6 shows an example of contamination caused by a line pattern.
Figure 5:
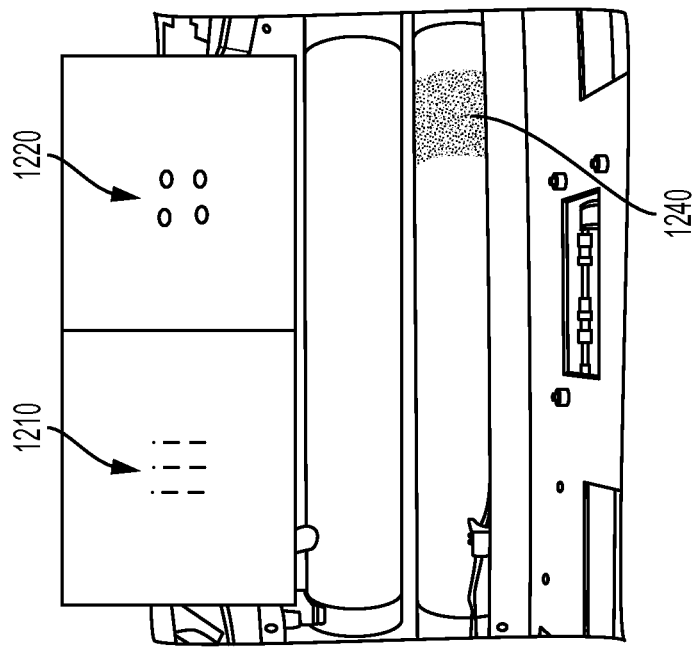
FIG. 5 shows an example of contamination caused by a dot pattern.

FIGS. 5 and 6 show the results of a document having half of its image created using a conventional toner dot pattern and the other half created with an equivalent line like toner design pattern. The line like design pattern showed a reduction in contamination for the equivalent half tone image. FIG. 5 shows the document having the right half of its image created using a conventional toner dot pattern 1220 and the left half created with an equivalent line like toner design pattern 1210. FIG. 5 shows contamination 1240 that resulted from the conventional toner dot pattern 1220. FIG. 6 shows the document having the left half of its image created using a conventional toner dot pattern 1320 and the right half created with an equivalent line like toner design pattern 1310. FIG. 6 shows a reduced contamination 1340 that resulted from the equivalent line like toner design pattern 1310.

While some of the examples above discussed using CNT fuser rolls, it is noted that the disclosure also applies to other types of fuser rolls, particularly fuser rolls with stiffer surfaces. Embodiments of the disclosure permit higher production speeds, particularly on rough media, while maintaining acceptable contamination rates.

Embodiments of the disclosure recognize that increasing the ratio of the image area to image perimeter of a particular spot of toner results in less contamination. For example, changing the toner pattern from a dot pattern to an oval pattern increases the image area to image perimeter ratio for each spot of toner. Further, changing the toner pattern from a dot pattern to a line pattern increases even further the image area to image perimeter ratio for each spot of toner. By increasing this ratio, for a given image area there is less perimeter. Because it is the perimeter of the toner spot that does not compress as well as the middle of the spot (and thus causes a significant portion of toner contamination) when fuser rolls with stiffer surfaces are used, reducing the perimeter can reduce toner contamination.

Embodiments of the disclosure use an algorithm feature that remaps the half tone area from a conventional toner dot design to a line like pattern in order to minimize toner dirt contamination. The remapping function can be a selectable feature that can be selected for certain print jobs that contain half tone images and or use rough media.

Matching the half tone image may require a correlation curve to simulate the half tone image from a dot design to a non-dot or line design. In this case, the remapping algorithm looks at the processed half tone image content and uses the correlation curve to select the equivalent halftone image with the non-dot ort line like toner design.

Figure 7:
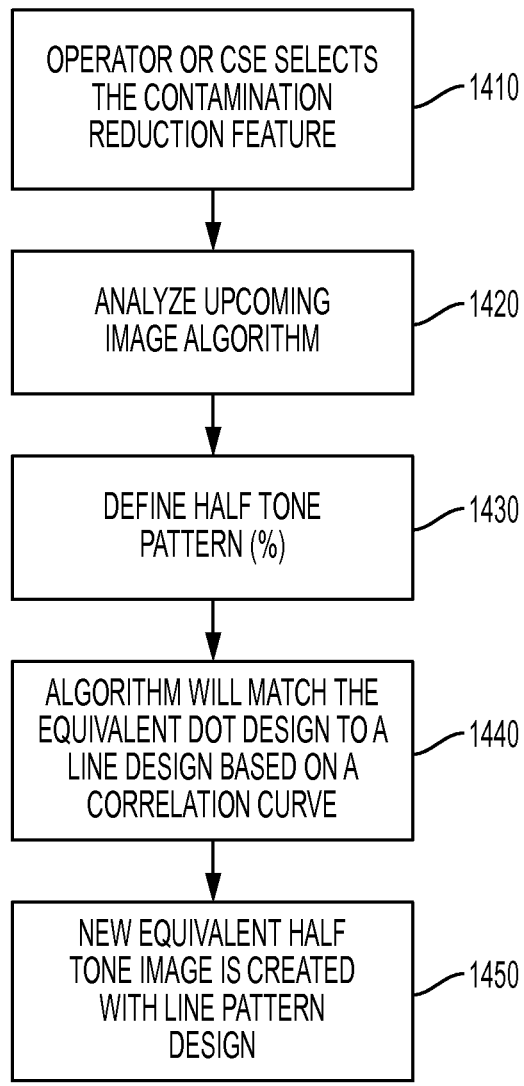
FIG. 7 shows an example of a method in accordance with embodiments of the disclosure.

FIG. 7 shows an example of a method in accordance with embodiments of the disclosure. In 1410 an operator or customer support engineer (CSE) selects the contamination reduction feature. In 1420 the half tone image is analyzed by an algorithm and in 1430 the half tone pattern in defined. In 1440 the algorithm matches the dot design with an equivalent non-dot or line design. This matching can be based on a correlation curve. In 1450 a new equivalent half tone image is created using the non-dot or line design.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of printing a half tone image on an image forming apparatus using toner that is fused to a substrate, the method comprising:
   generating a dot design that represents the half tone image, the dot design being made up of a plurality of dots;
   analyzing the dot design using an algorithm;
   matching the dot design to an equivalent alternate design that represents the half tone image, the matching being based on results of the analyzing, the equivalent alternate design being made up substantially entirely of a plurality of non-dot shapes;
   forming the half tone image on the substrate using the equivalent alternate design; and
   fusing the half tone image on the substrate with a fuser device,
   wherein a total image area of the dot design is the sum of an image area of every one of the dots in the dot design,
   a total image perimeter of the dot design is the sum of an image perimeter of every one of the dots in the dot design,
   a total image area of the alternate design is the sum of an image area of every one of the non-dot shapes in the alternate design,
   a total image perimeter of the alternate design is the sum of an image perimeter of every one of the non-dot shapes in the alternate design, and
   a ratio of the total image area of the alternate design to the total image perimeter of the alternate design is greater than a ratio of the total image area of the dot design to the total image perimeter of the dot design.

2. The method of claim 1, further comprising defining a density of the dot design, the density being determined by the analyzing.

3. The method of claim 1, wherein the non-dot shapes are lines.

4. The method of claim 3, wherein the fusing device is a fuser roll.

5. The method of claim 4, wherein the fusing device is a fuser roll having a carbon nanotube outer surface.

6. The method of claim 5, further comprising heating the fuser roll with an external heat roll, and
   cleaning the external heat roll with a cleaning system.

7. The method of claim 6, wherein the cleaning system is a web cleaning system.

8. The method of claim 7, wherein the analyzing is a selectable function that can be selected by a user of the image forming apparatus such that the user can select whether or not the analyzing is performed.

9. The method of claim 1, wherein the analyzing is a selectable function that can be selected by a user of the image forming apparatus such that the user can select whether or not the analyzing is performed.

10. An image forming apparatus for printing a half tone image using toner that is fused to a substrate, the apparatus comprising:
    means for generating a dot design that represents the half tone image, the dot design being made up of a plurality of dots;
    means for analyzing the dot design using an algorithm;
    means for matching the dot design to an equivalent alternate design that represents the half tone image, the matching being based on results of the analyzing, the equivalent alternate design being made up substantially entirely of a plurality of non-dot shapes;
    means for forming the half tone image on the substrate using the equivalent alternate design; and
    means for fusing the half tone image on the substrate with a fuser device,
    wherein a total image area of the dot design is the sum of an image area of every one of the dots in the dot design,
    a total image perimeter of the dot design is the sum of an image perimeter of every one of the dots in the dot design,
    a total image area of the alternate design is the sum of an image area of every one of the non-dot shapes in the alternate design,
    a total image perimeter of the alternate design is the sum of an image perimeter of every one of the non-dot shapes in the alternate design, and
    a ratio of the total image area of the alternate design to the total image perimeter of the alternate design is greater than a ratio of the total image area of the dot design to the total image perimeter of the dot design.

11. The image forming apparatus of claim 10, further comprising means for defining a density of the dot design, the density being determined by the analyzing.

12. The image forming apparatus of claim 10, further comprising means for heating the fuser roll with an external heat roll, and means for cleaning the external heat roll with a cleaning system.

13. An image forming apparatus for printing a half tone image using toner that is fused to a substrate, the apparatus comprising:
   a processor that uses an algorithm to analyze a dot design that represents the half tone image, the dot design being made up of a plurality of dots, the processor matching the dot design to an equivalent alternate design that represents the half tone image, the matching being based on results of the analysis, the equivalent alternate design being made up substantially entirely of a plurality of non-dot shapes; and
   a fuser device that fuses the half tone image on the substrate, the half tone image being formed on the substrate prior to the fusing, the half tone image being formed using the equivalent alternate design,
   wherein a total image area of the dot design is the sum of an image area of every one of the dots in the dot design,
   a total image perimeter of the dot design is the sum of an image perimeter of every one of the dots in the dot design,
   a total image area of the alternate design is the sum of an image area of every one of the non-dot shapes in the alternate design,
   a total image perimeter of the alternate design is the sum of an image perimeter of every one of the non-dot shapes in the alternate design, and
   a ratio of the total image area of the alternate design to the total image perimeter of the alternate design is greater than a ratio of the total image area of the dot design to the total image perimeter of the dot design.

14. The apparatus of claim 13, wherein the processor determines a density of the dot design.

15. The apparatus of claim 13, wherein the non-dot shapes are lines.

16. The apparatus of claim 15, wherein the fusing device is a fuser roll.

17. The apparatus of claim 16, wherein the fusing device is a fuser roll having a carbon nanotube outer surface.

18. The apparatus of claim 17, further comprising an external heater roll, the external heater roll heating the fuser roll, and
   a cleaning system configured to clean the external heat roll.

19. The apparatus of claim 18, wherein the cleaning system is a web cleaning system.

20. The apparatus of claim 19, wherein the processor is configured such that a user can select whether or not the analysis is performed.

* * * * *